(12) United States Patent
Hsu

(10) Patent No.: US 11,627,642 B2
(45) Date of Patent: Apr. 11, 2023

(54) FLEXIBLE HEATING APPARATUS

(71) Applicant: Powergene Technology Co., Ltd., Taiwan Branch, New Taipei (TW)

(72) Inventor: Hui-Te Hsu, New Taipei (TW)

(73) Assignee: POWERGENE TECHNOLOGY CO., LTD., TAIWAN BRANCH, New Taipei (TW)

( * ) Notice: Subject to any disclaimer, the term of this patent is extended or adjusted under 35 U.S.C. 154(b) by 694 days.

(21) Appl. No.: 16/726,556

(22) Filed: Dec. 24, 2019

(65) Prior Publication Data

US 2021/0195694 A1    Jun. 24, 2021

(51) Int. Cl.
| | | |
|---|---|---|
| *H05B 3/54* | (2006.01) | |
| *H05B 3/34* | (2006.01) | |
| *H02J 50/10* | (2016.01) | |
| *B01L 7/00* | (2006.01) | |
| *B65D 81/38* | (2006.01) | |

(52) U.S. Cl.
CPC .................. *H05B 3/54* (2013.01); *B01L 7/00* (2013.01); *H02J 50/10* (2016.02); *H05B 3/345* (2013.01); *B65D 81/3876* (2013.01); *H05B 2203/017* (2013.01)

(58) Field of Classification Search
CPC .... H05B 3/54; H05B 3/345; H05B 2203/017; H02J 50/10; B01L 7/00; B65D 81/3876
See application file for complete search history.

(56) References Cited

U.S. PATENT DOCUMENTS

| | | | |
|---|---|---|---|
| 2008/0083720 A1* | 4/2008 | Gentile | A43B 3/35 219/211 |
| 2008/0290080 A1* | 11/2008 | Weiss | H05B 1/0238 219/202 |
| 2015/0282556 A1* | 10/2015 | Zsolcsak | A43B 3/0031 219/211 |
| 2018/0317597 A1* | 11/2018 | Maxey | H02J 50/402 |

\* cited by examiner

*Primary Examiner* — Bao Q Truong
(74) *Attorney, Agent, or Firm* — Muncy, Geissler, Olds & Lowe, P.C.

(57) ABSTRACT

A flexible heating apparatus can heat a heated body. The flexible heating apparatus includes a flexible carrier, a heating unit and a control module. The heating unit is at least one layer arranged inside the flexible carrier. The control module is arranged inside the flexible carrier and is electrically connected to the heating unit. Moreover, the control module is connected to an external electric apparatus, and is controlled by the external electric apparatus to control the heating unit to proceed a heating control to the heated body.

13 Claims, 4 Drawing Sheets

FLEXIBLE HEATING APPARATUS

BACKGROUND OF THE INVENTION

Field of the Invention

The present invention relates to a heating apparatus, and especially relates to a flexible heating apparatus which comprises a nanometer heat conductive material and can be manufactured in any appearance shapes.

Description of the Related Art

Currently, in the related technology of the related art flexible electric heating apparatus, mainly electric energy is converted into heat energy to proceed heating effect. The heating components used in the electric heating apparatuses are usually arranged in the flexible carriers, for examples, in the lining spaces of the clothes, gloves, scarfs, blankets or cup pads. When the control circuit drives the heating component, the heating component can proceed heating action to generate proper heating temperature in the clothes, gloves, scarfs, blankets or cup pads to heat and keep warm for the human body or to heat the cup body.

Because there are many kinds of the heating components used in the related art flexible electric heating apparatuses, the heating components made of different materials have to be used in the flexible carriers made of different materials, to avoid the heating efficiency of the heating components from failing or to avoid the heating temperature from being too high, wherein the materials or the textures of the flexible carrier itself are damaged due to too high temperature, and even the effects of waterproof and antifouling of the flexible carrier itself are influenced, so the difficulty of manufacturing the related art flexible electric heating apparatus increases.

SUMMARY OF THE INVENTION

Therefore, the main object of the present invention is to solve the deficiency mentioned above, so the present invention provides a heating unit made of a nanometer heat conductive material. The heating unit can be used in the flexible carriers made of different materials. The appearance/shape of the flexible heating apparatus is changed/manufactured easily. The heating efficiency of the heating unit is not easy to fail. The flexible heating apparatus can be connected to and controlled by a smart mobile apparatus.

Another object of the present invention is that the flexible carrier can be manufactured in different appearances/shapes, for examples, the cup sleeve, the cup pad, the scarf, the toilet seat or the shoe pad, and so on.

In order to achieve the objects mentioned above, the present invention provides a flexible heating apparatus which can heat a heated body. The flexible heating apparatus comprises a flexible carrier, a heating unit and a control module. The heating unit is at least one layer arranged inside the flexible carrier. The control module is arranged inside the flexible carrier and is electrically connected to the heating unit. Moreover, the control module is connected to an external electric apparatus, and is controlled by the external electric apparatus to control the heating unit to proceed a heating control to the heated body.

In an embodiment of the present invention, the flexible carrier is a rubber material, a plastic material or a fabric material, and so on.

In an embodiment of the present invention, the flexible carrier is a cup sleeve, a shoe pad, a cup pad, a toilet seat or a scarf.

In an embodiment of the present invention, the control module comprises a control unit, a wireless receiving-transmitting unit, a charging unit, a temperature sensing unit and a power supply unit. The control unit comprises a memory inside the control unit. The memory is configured to store a software which controls and drives the heating unit, and to store various controlling setting parameter values. The wireless receiving-transmitting unit is electrically connected to the control unit and is configured to receive an external control signal and to transmit a signal to an external electric apparatus which receives the signal. The charging unit is electrically connected to the control unit and is configured to receive an external power. The power supply unit is electrically connected to the charging unit and is configured to receive a power outputted by the charging unit.

In an embodiment of the present invention, the wireless receiving-transmitting unit is a Bluetooth unit, a Wireless-Fidelity (Wi-Fi) unit and/or a radio frequency (RF) unit.

In an embodiment of the present invention, the charging unit is a wireless charging unit.

In an embodiment of the present invention, the flexible heating apparatus further comprises a charging connector electrically connected to the charging unit. The charging unit is configured to receive the external power through the charging connector.

In an embodiment of the present invention, the charging connector is a micro USB.

In an embodiment of the present invention, the charging unit is electrically connected to a charging cord to receive the external power.

In an embodiment of the present invention, the charging cord is a USB connection connector charging cord.

In an embodiment of the present invention, the power supply unit is a rechargeable battery or a super capacitor.

In an embodiment of the present invention, the flexible heating apparatus further comprises a temperature sensing unit electrically connected to the control unit and configured to sense whether a heating temperature of the heated body achieves a setting value or not, and configured to send a temperature signal to the control unit, and then the control unit is configured to control the heating unit to heat the heated body (namely, the control unit is configured to control an action of the heating unit for the heated body).

In an embodiment of the present invention, the temperature sensing unit is a thermistor.

In an embodiment of the present invention, the heating unit is a nanometer heat conductive material.

DETAILED DESCRIPTION OF THE INVENTION

Figure 1:
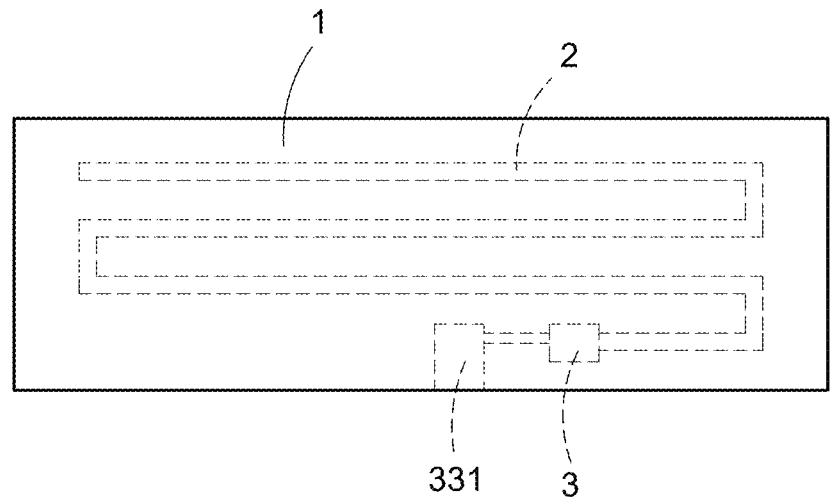
FIG. 1 shows an appearance diagram of the first embodiment of the flexible heating apparatus of the present invention.

Now please refer to the figures for the explanation of the technical content and the detailed description of the present invention:

FIG. 1 shows an appearance diagram of the first embodiment of the flexible heating apparatus of the present invention. As shown in FIG. 1, a flexible heating apparatus of the present invention comprises a flexible carrier 1, a heating unit 2 and a control module 3.

The flexible carrier 1 can be manufactured in various shapes and can be used in different item areas (for examples, a cup pad, a cup sleeve, a shoe pad, a toilet seat or a scarf) to cover or to be arranged under a heated body (not shown in FIG. 1). In FIG. 1, the flexible carrier 1 is a rubber material, a plastic material or a fabric material, and so on.

The heating unit 2 is at least one layer arranged inside the flexible carrier 1 and is electrically connected to the control module 3 and is able to heat the heated body. In FIG. 1, the heating unit 2 is a nanometer heat conductive material.

The control module 3 is arranged inside the flexible carrier 1 and is electrically connected to the heating unit 2. The control module 3 is wired-connected or wireless-connected to an external electric apparatus (not shown in FIG. 1). After downloading application software programs through the external electric apparatus, the external electric apparatus can be used to control the control module 3 to control the heating unit 2 to proceed a heating control to the heated body. In the embodiment of FIG. 1, the external electric apparatus is a smart mobile apparatus.

Further, the heating unit 2 and the control module 3 are covered by/inside the flexible carrier 1 (namely, are arranged inside the flexible carrier 1) to have a waterproof effect. The flexible carrier 1 can be washed (namely, washable).

Figure 2:
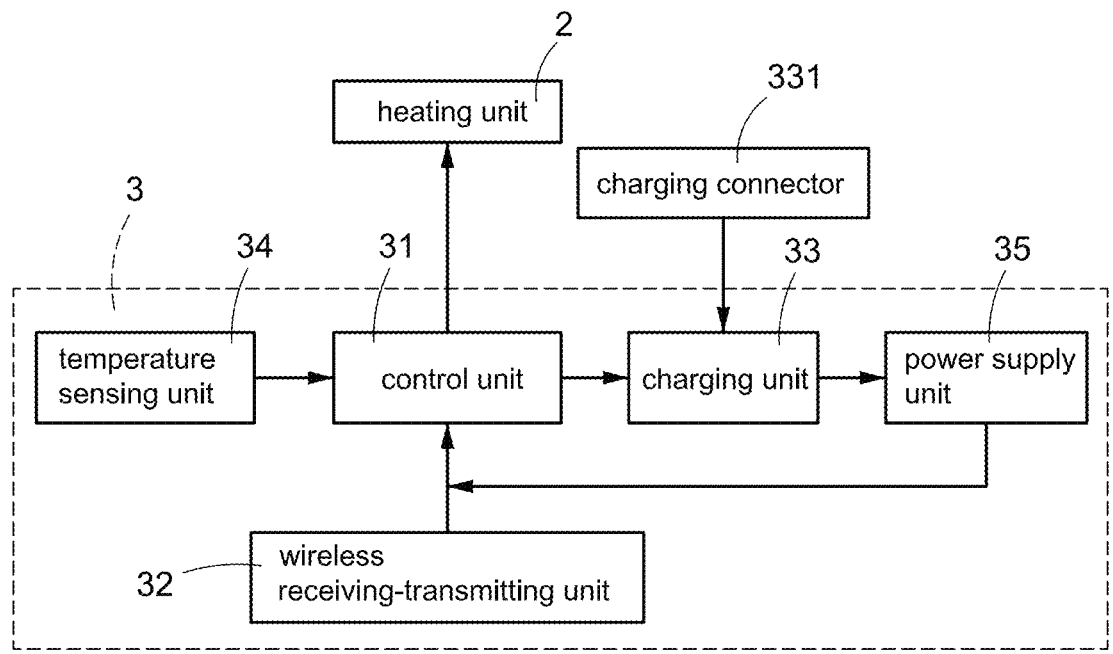
FIG. 2 shows a circuit block diagram of the control module of the present invention.

FIG. 2 shows a circuit block diagram of the control module of the present invention. As shown in FIG. 2, the control module 3 of the present invention comprises a control unit 31, a wireless receiving-transmitting unit 32, a charging unit 33, a temperature sensing unit 34 and a power supply unit 35.

The control unit 31 comprises a memory (not shown in FIG. 2) inside the control unit 31. The memory is configured to store a software which controls and drives the heating unit 2, and to store various controlling setting parameter values.

The wireless receiving-transmitting unit 32 is electrically connected to the control unit 31 and is configured to receive an external control signal and to transmit a signal to an external electric apparatus 4 which receives the signal, so that the external electric apparatus 4 can control a heating mode and a heating time of the control module 3 for the heated body (not shown in FIG. 2). In FIG. 2, the wireless receiving-transmitting unit 32 is a Bluetooth unit, a Wireless-Fidelity (Wi-Fi) unit and/or a radio frequency (RF) unit.

The charging unit 33 is electrically connected to the control unit 31 and is configured to receive an external power to charge the power supply unit 35. In FIG. 2, the charging unit 33 is a wireless charging unit. Or, the flexible heating apparatus further comprises a charging connector 331 (for example, a micro USB connector) electrically connected to the charging unit 33; the charging unit 33 receives the external power through the charging connector 331 or a charging cord (not shown in FIG. 2; for example, a USB connection connector charging cord) to charge the power supply unit 35.

The temperature sensing unit 34 is electrically connected to the control unit 31 and configured to sense a heating temperature of the heated body. When the heated body is heated to achieve a setting value, the temperature sensing unit 34 is configured to send a temperature signal to the control unit 31, and then the control unit 31 is configured to stop heating the heating unit 2. Or the control unit 31 is configured to transmit a wireless signal to the external electric apparatus 4 through the wireless receiving-transmitting unit 32, and then the user controls the control unit 31 through the external electric apparatus 4 to stop heating the heating unit 2. When the temperature sensing unit 34 senses that the temperature of the heated body is lower than the setting value, the temperature sensing unit 34 is configured to send the temperature signal to the control unit 31, and then the control unit 31 is configured to control the heating unit 2 to heat the heated body. Or the control unit 31 is configured to transmit the wireless signal to the external electric apparatus 4 through the wireless receiving-transmitting unit 32, and then the user controls the control unit 31 through the external electric apparatus 4 to control the heating unit 2 to heat the heated body. In FIG. 2, the temperature sensing unit 34 is a thermistor.

The power supply unit 35 is electrically connected to the charging unit 33 and is configured to receive a power outputted by the charging unit 33. When the power supply unit 35 is not charged, the power supply unit 35 supplies a required power to the control module 3. In FIG. 2, the power supply unit 35 is a rechargeable battery or a super capacitor.

Figure 3:
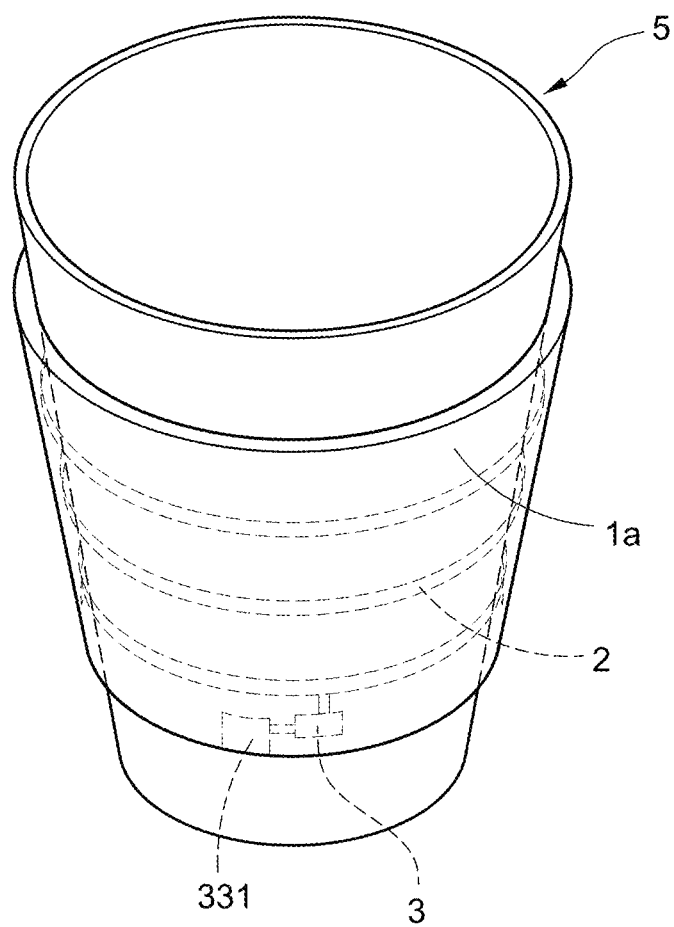
FIG. 3 shows a diagram of the second embodiment of the present invention.

FIG. 3 shows a diagram of the second embodiment of the present invention. Please refer to FIG. 2 at the same time. As shown in FIG. 3, the second embodiment of the present invention is basically similar with the first embodiment. The difference is that a shape of the flexible carrier 1 of the second embodiment is a cup sleeve 1a. The user can sleeve the cup body 5 with the cup sleeve 1a. When the control module 3 receives a control command of the external electric apparatus 4, the control unit 31 of the control module 3 can control the heating unit 2 to heat the cup body 5. When the temperature sensing unit 34 senses that the temperature of the cup body 5 is lower or higher than the setting value, the temperature sensing unit 34 is configured to send the temperature signal to the control unit 31, and then the control unit 31 is configured to control the heating unit 2 to heat the cup body 5 or to stop heating the cup body 5. Or the control unit 31 is configured to transmit the wireless signal to the external electric apparatus 4 through the wireless receiving-transmitting unit 32, and then the user controls the control unit 31 through the external electric apparatus 4 to control the heating unit 2 to heat the cup body 5 or to stop heating the cup body 5.

When the power is exhausted and the charging unit 33 is the wireless charging unit, the power supply unit 35 can be charged by a wireless charger (not shown in FIG. 3). Or when the power is exhausted, the charging unit 33 receives the external power through the charging connector 331 or the charging cord (not shown in FIG. 3) to charge the power supply unit 35.

Figure 4:
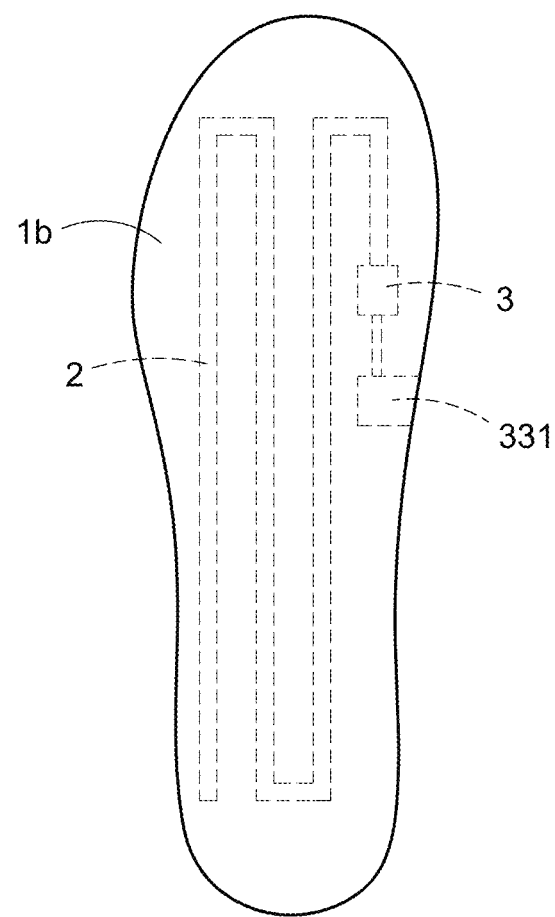
FIG. 4 shows a diagram of the third embodiment of the present invention.

FIG. 4 shows a diagram of the third embodiment of the present invention. Please refer to FIG. 2 at the same time. As shown in FIG. 4, the third embodiment of the present invention is basically similar with the first embodiment and the second embodiment. The difference is that the shape of the flexible carrier 1 of the third embodiment is a shoe pad 1b. The user can arrange the shoe pad 1b inside a shoe (not shown in FIG. 4). When the control module 3 receives the control command of the external electric apparatus 4, the control unit 31 of the control module 3 can control the heating unit 2 to heat the shoe pad 1b. When the temperature sensing unit 34 senses that the temperature of the shoe pad 1b is lower or higher than the setting value, the temperature sensing unit 34 is configured to send the temperature signal to the control unit 31, and then the control unit 31 is configured to control the heating unit 2 to heat the shoe pad 1b or to stop heating the shoe pad 1b. Or the control unit 31 is configured to transmit the wireless signal to the external electric apparatus 4 through the wireless receiving-transmitting unit 32, and then the user controls the control unit 31 through the external electric apparatus 4 to control the heating unit 2 to heat the shoe pad 1b or to stop heating the shoe pad 1b.

When the power is exhausted and the charging unit 33 is the wireless charging unit, the power supply unit 35 can be charged by the wireless charger (not shown in FIG. 4). Or when the power is exhausted, the charging unit 33 receives the external power through the charging connector 331 or the charging cord (not shown in FIG. 4) to charge the power supply unit 35.

Figure 5:
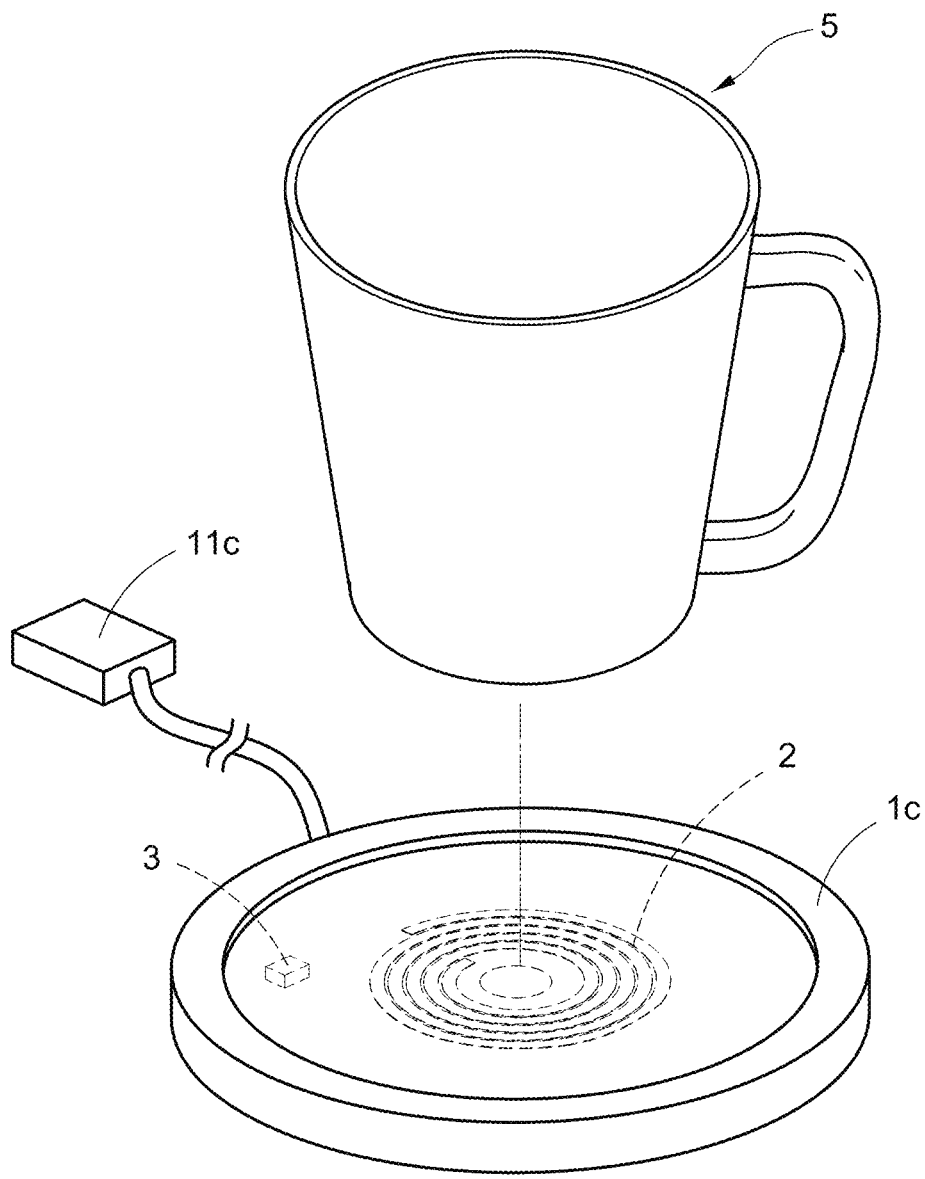
FIG. 5 shows a diagram of the fourth embodiment of the present invention.

FIG. 5 shows a diagram of the fourth embodiment of the present invention. Please refer to FIG. 2 at the same time. As shown in FIG. 5, the fourth embodiment of the present invention is basically similar with the first embodiment, the second embodiment and the third embodiment. The difference is that the shape of the flexible carrier 1 of the fourth embodiment is a cup pad 1c. The user can arrange the cup body 5 on the cup pad 1c. When the control module 3 receives the control command of the external electric apparatus 4, the control unit 31 of the control module 3 can control the heating unit 2 to heat the cup body 5. When the temperature sensing unit 34 senses that the temperature of the cup body 5 is lower or higher than the setting value, the temperature sensing unit 34 is configured to send the temperature signal to the control unit 31, and then the control unit 31 is configured to control the heating unit 2 to heat the cup body 5 or to stop heating the cup body 5. Or the control unit 31 is configured to transmit the wireless signal to the external electric apparatus 4 through the wireless receiving-transmitting unit 32, and then the user controls the control unit 31 through the external electric apparatus 4 to control the heating unit 2 to heat the cup body 5 or to stop heating the cup body 5.

When the power is exhausted and the charging unit 33 is the wireless charging unit, the power supply unit 35 can be charged by the wireless charger (not shown in FIG. 5).

Further, the charging unit 33 of the control module 3 of the cup pad 1c receives the external power through the charging connector 331 or a charging cord 11c (for example, a USB connection connector charging cord) to charge the power supply unit 35.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A flexible heating apparatus heating a heated body, the flexible heating apparatus comprising:
a flexible carrier;
a heating unit being at least one layer arranged inside the flexible carrier; and
a control module arranged inside the flexible carrier and electrically connected to the heating unit,
wherein the control module is connected to an external electric apparatus, and is controlled by the external electric apparatus to control the heating unit to proceed a heating control to the heated body;
wherein the control module comprises:
a control unit comprising a memory inside the control unit, the memory configured to store a software controlling and driving the heating unit, the memory configured to store various controlling setting parameter values;
a wireless receiving-transmitting unit electrically connected to the control unit and configured to receive an external control signal and configured to transmit a signal to the external electric apparatus receiving the signal;
a charging unit electrically connected to the control unit and configured to receive an external power; and
a power supply unit electrically connected to the charging unit and configured to receive a power outputted by the charging unit.

2. The flexible heating apparatus in claim 1, wherein the flexible carrier is a rubber material, a plastic material or a fabric material.

3. The flexible heating apparatus in claim 1, wherein the flexible carrier is a cup sleeve, a shoe pad, a cup pad, a toilet seat or a scarf.

4. The flexible heating apparatus in claim 1, wherein the wireless receiving-transmitting unit is a bluetooth unit, a wireless-fidelity unit or a radio frequency unit.

5. The flexible heating apparatus in claim 1, wherein the charging unit is a wireless charging unit.

6. The flexible heating apparatus in claim 1 further comprising a charging connector electrically connected to the charging unit, wherein the charging unit is configured to receive the external power through the charging connector.

7. The flexible heating apparatus in claim 6, wherein the charging connector is a micro usb.

8. The flexible heating apparatus in claim 1, wherein the charging unit is electrically connected to a charging cord to receive the external power.

9. The flexible heating apparatus in claim 8, wherein the charging cord is a usb connection connector charging cord.

10. The flexible heating apparatus in claim 1, wherein the power supply unit is a rechargeable battery or a super capacitor.

11. The flexible heating apparatus in claim 1 further comprising a temperature sensing unit electrically connected to the control unit and configured to sense whether a heating temperature of the heated body achieves a setting value or not, and configured to send a temperature signal to the control unit, the control unit configured to control the heating unit to heat the heated body.

12. The flexible heating apparatus in claim 11, wherein the temperature sensing unit is a thermistor.

13. The flexible heating apparatus in claim 1, wherein the heating unit is a nanometer heat conductive material.

* * * * *